US 6,657,855 B2

(12) United States Patent
Misawa et al.

(10) Patent No.: US 6,657,855 B2
(45) Date of Patent: Dec. 2, 2003

(54) PORTABLE INFORMATION PROCESSING APPARATUS

(75) Inventors: Junichiro Misawa, Tokyo (JP); Yoshikazu Hajiro, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/960,169

(22) Filed: Sep. 20, 2001

(65) Prior Publication Data

US 2002/0089819 A1 Jul. 11, 2002

(30) Foreign Application Priority Data

Sep. 22, 2000 (JP) ........................................ 2000-288941

(51) Int. Cl.$^7$ ................................................ G06F 1/16
(52) U.S. Cl. ....................... 361/683; 361/684; 361/686; 312/223.2; 455/564
(58) Field of Search ................................. 361/683, 684, 361/685, 686, 681, 724–727, 749, 759; 312/223.1, 223.2; 455/564, 566, 90, 550, 575; G06K 11/18; G06F 1/16

(56) References Cited

U.S. PATENT DOCUMENTS 6,401,030 B1 * 6/2002 Watanabe et al. ........... 701/202
6,473,296 B2 * 10/2002 Amemiya et al. .......... 361/683

FOREIGN PATENT DOCUMENTS

| EP | 1 006 477 A2 | * | 7/2000 | ........... G06K/11/18 |
| JP | 409-016306 A | * | 1/1997 | ........... G06F/3/023 |
| JP | 2000-330707 A | * | 11/2000 | ........... G06F/3/023 |
| JP | 2001-092584 A | * | 4/2001 | ........... G06F/3/023 |
| JP | 2002-082754 A | * | 3/2002 | ............. G06F/3/02 |

* cited by examiner

Primary Examiner—Michael Datskovsky
(74) Attorney, Agent, or Firm—Frommer Lawrence & Haug LLP; William S. Frommer

(57) ABSTRACT

The invention provides a portable information processing apparatus such as a notebook personal computer which is improved in operability for an operation element which can be rotated and pushed in. A lid member having a display screen is mounted for pivotal folding and unfolding movement on and with respect to a body of a notebook personal computer. A keyboard, a touch pad, left and right click buttons, and an operation element, which can be rotated in the forward and backward directions and can be displaced by a push-in operation, are provided on an upper face of the body. For example, when the operation element is rotated, an application is selected, and the selected application is executed by a push-in operation of the operation element. The operation element is disposed at a substantially central position of a palm rest, which is provided on the upper face of the body forwardly of the keyboard, in the leftward and rightward directions of the body in the proximity of the touch pad or the left and right click buttons. The operation element may otherwise be disposed between the left and right click buttons or between the touch pad and the keyboard.

14 Claims, 13 Drawing Sheets

(IN THE CASE OF BACKWARD ROTATION)

(IN THE CASE OF FORWARD ROTATION)

PORTABLE INFORMATION PROCESSING APPARATUS

BACKGROUND OF THE INVENTION

This invention relates to a portable information processing apparatus such as a personal computer of the notebook type.

In a portable information processing apparatus represented, for example, by a personal computer of the notebook type, a lid member having a display screen on an inner face thereof is mounted for pivotal folding and unfolding movement on a body having a keyboard on an upper face thereof. A touch pad is provided at a substantially central position on the upper face of the body in the leftward and rightward directions of the body forwardly of the keyboard. The touch pad can be traced with a fingertip to perform such an operation as, for example, an operation for moving a pointer displayed on the display screen. In most cases, a left click button and a right click button are provided forwardly of the touch pad (refer to, for example, Japanese Patent Laid-Open No. Hei 11-102234/1999). In this manner, the touch pad and the left and right buttons in the portable information processing apparatus function as a mouse which is required by a personal computer of the desktop type.

Also a portable information processing apparatus of the stick type which includes a stick for operating a pointer in place of a touch pad is known. In the portable information apparatus of the type mentioned, the stick is disposed at a substantially central portion of the keyboard on the upper face of the body in the leftward and rightward directions of the body and is used such that an upper portion thereof is moved forwardly or backwardly and/or leftwardly or rightwardly with a finger tip to operate the pointer.

Furthermore, a portable information processing apparatus of the track ball type which includes a track ball for operating a pointer in place of a touch pad is known as well. In the portable information processing apparatus of the type mentioned, the track ball is disposed at a substantially central portion on the upper face of the body in the leftward and rightward directions of the body forwardly of the keyboard and is used such that it is rolled or rotated with a fingertip to operate the pointer.

In the portable information processing apparatus of both of the stick type and the track ball type, the left button and the right button are provided at a substantially central position on the upper face of the body in the leftward and rightward directions forwardly of the keyboard.

Recently, a portable information processing apparatus wherein an operation element, which can be manually rotated and pushed in, called jog dial is provided on a side face of a body in order to assure good convenience of use of the apparatus itself, good convenience of use of application software and so froth has been placed on the market by the assignee of the present application. The jog dial is provided on one of the left and right side faces of the body such that it can be rotated forwardly and backwardly (can be manually operated forwardly and backwardly to rotate) around a vertical axis and can be pushed in and displaced bodily and laterally.

The jog dial can be used such that, for example, one of a plurality of names of application software displayed on the display screen is designated or selected making use of forward or reverse rotation of the jog dial and then execution of the thus selected name of application software is started by push-in displacement of the jog dial. Mechanical variations obtained by operation of the jog dial basically provide three-dimensional factors including rotation in the two directions and push-in displacement. Further, depending upon the amount of rotation in either direction or by arithmetic operation based on such an amount of rotation, also the speed of rotation in any direction of rotation can be obtained. Accordingly, by allocating a variation caused by operation of the jog dial to a particular function of the portable information processing apparatus itself or to a suitable function or functions of application software, significant improvement in convenience of use can be anticipated.

Meanwhile, another portable information processing apparatus has been placed on the market recently wherein the left and right click buttons are provided forwardly of the touch pad, that is, on the nearer side to the user with respect to the touch pad and a scroll button is provided at a position between the left and right click buttons. The scroll button is formed as a button of the seesaw type which can be rocked in the forward and backward directions. For example, if the scroll button is depressed at the rear side thereof, then scrolling in a predetermined one direction is performed, but if the scroll button is depressed at the front side thereof, then scrolling in the other direction is performed. However, when the scroll button of the seesaw type is operated, only two kinds of mechanical variation including depression of the front side and the rear side are available. Thus, the scroll button does not provide satisfactory convenience of use.

As described above, employment of such a jog dial as described can provide improved convenience of use to a portable information processing apparatus. However, since the jog dial is disposed on a side face of the body, in order to operate the jog dial, the user must move its one hand by a great distance not only from the keyboard but also from the touch pad or a click button. Therefore, the jog dial has a room for improvement in terms of the operability thereof. Further, since the jog dial is provided on a particular one side face of the body, the jog dial may be positioned reversely to the hand of the user more skillful than the other hand in regard to the leftward and rightward directions. In this instance, the user is obliged to use its hand different from the more skillful hand to operate the jog dial. Also in this regard, the jog dial has a room in improvement.

SUMMARY OF THE INVENTION

It is an object of the present invention to provide a portable information processing apparatus which is improved in operability for an operation element which can be rotated and pushed in.

In order to attain the object described above, according to an aspect of the present invention, there is provided a portable information processing apparatus, comprising a body having a keyboard on an upper face thereof, a lid member having a display screen thereon and mounted for folding and unfolding movement on and with respect to the body, a touch pad provided at a substantially central position of the upper face of the body in the leftward and rightward directions of the body forwardly of the keyboard, and an operation element mounted in the proximity of the touch pad on the upper face of the body for forward and reverse rotation around an axial line extending substantially in parallel to the upper face of the body and for bodily displacement by push-in operation thereof.

According to another aspect of the present invention, there is provided a portable information processing apparatus, comprising a body having a keyboard on an upper face thereof, a lid member having a display screen thereon and mounted for folding and unfolding movement on and with respect to the body, a left click button and a right click button provided at a substantially central position of the upper face of the body in the leftward and rightward directions of the body forwardly of the keyboard, and an operation element mounted in the proximity of the click buttons on the upper face of the body for forward and reverse rotation around an axial line extending substantially in parallel to the upper face of the body and for bodily displacement by push-in operation thereof.

In both of the portable information processing apparatus, the touch pad or any of the click buttons is operated with a fingertip of the operator, and the operation element of the rotation and push-in type is positioned in the proximity of the fingertip. Therefore, the operator can operate the operation element by moving the fingertip only by a small amount without moving the hand by a great amount. Further, since the operation element of the rotation and push-in type is disposed at a substantially central position in the leftward and rightward directions of the body, whichever one of the left and right hands of the operator is the hand more skillful than the other hand, the operator can always operate the operation element with the more skillful hand. Consequently, the portable information processing apparatus can be used with improved convenience of use and with improved operability making use of the operation element of the rotation and push-in type.

The above and other objects, features and advantages of the present invention will become apparent from the following description and the appended claims, taken in conjunction with the accompanying drawings in which like parts or elements denoted by like reference symbols.

DESCRIPTION OF THE PREFERRED EMBODIMENTS

Figure 1:
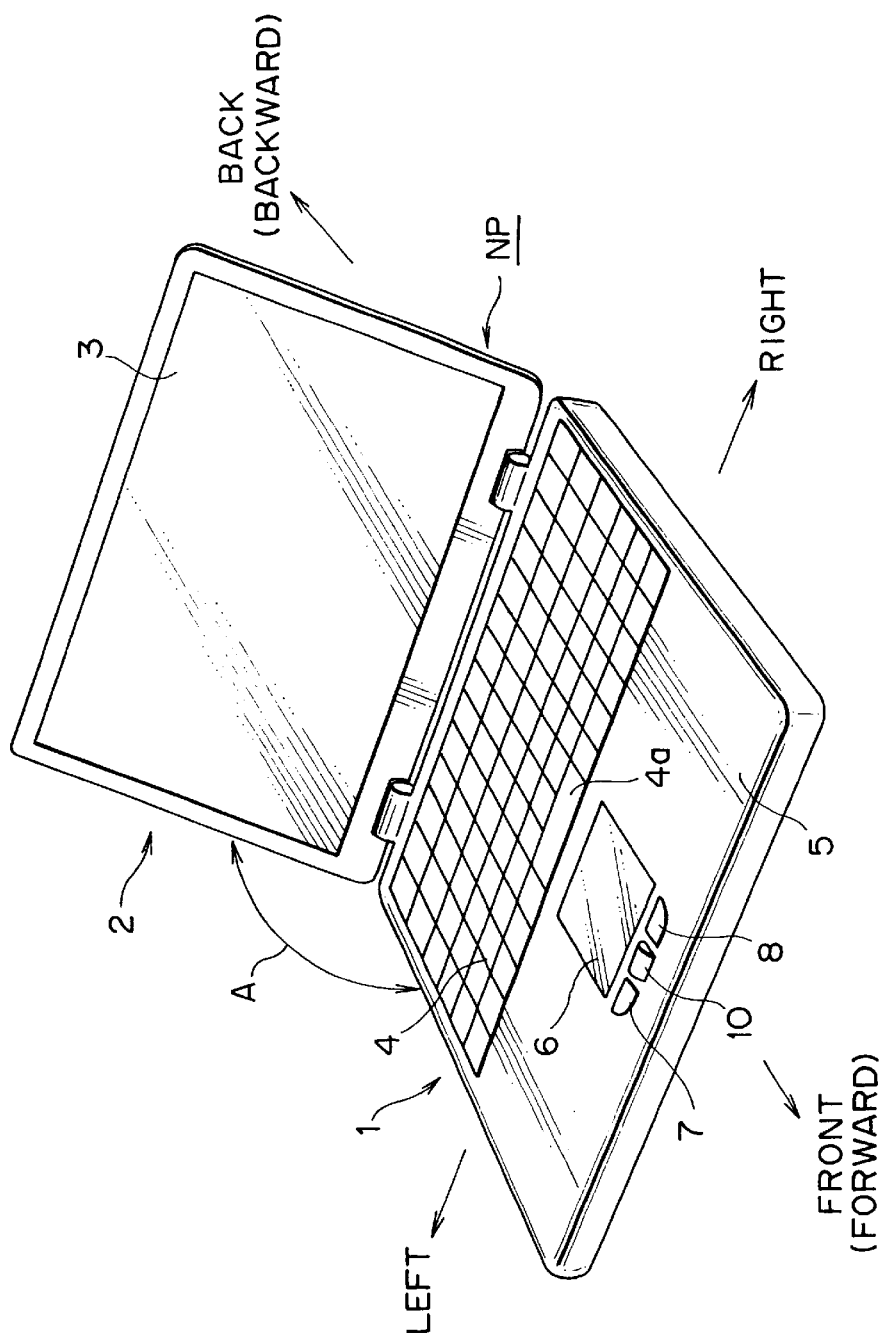
FIG. 1 is a perspective view of a personal computer of the notebook type to which the present invention is applied.

Referring first to FIG. 1, there is shown a personal computer of the notebook type (hereinafter referred to as notebook personal computer) as a portable information processing apparatus to which the present invention is applied. The notebook personal computer is generally denoted by NP and includes a body 1, and a lid member 2 mounted for pivotal folding and unfolding movement on and with respect to the body 1. In particular, the lid member 2 is connected to a rear end portion of the body 1 for rocking motion around an axis which extends in the leftward and rightward directions. The lid member 2 can thus be rocked as indicated by a double-side arrow mark A in FIG. 1 with respect to the body 1 to selectively assume a folded or closed position in which it is generally placed on the body 1 or another unfolded or open position in which it stands uprightly as seen in FIG. 1. It is to be noted that the forward and backward directions and the leftward and rightward directions are defined as seen in FIG. 1.

A flat display screen 3 such as a liquid crystal display panel is provided on an inner face of the lid member 2. A keyboard 4 is disposed on an upper face of the body 1. The keyboard 4 includes a large number of keys such as alphabetical keys, ten keys and various function keys and has a shape generally elongated in the leftward and rightward directions. The keyboard 4 is disposed at a substantially rear half of the upper face of the body 1. A portion of the upper face of the body 1 forwardly of the keyboard 4 serves as a palm rest 5 having a large area.

A touch pad 6, a left click button 7 and a right click button 8 are disposed on the upper face of the body 1, more particularly on the palm rest 5 forwardly of the keyboard 4. As shown more particularly in FIG. 2, the touch pad 6 in the present embodiment has a substantially square shape and is disposed at a substantially central portion of the body 1 in the leftward and rightward directions in the proximity of the keyboard 4. More particularly, a rear end of the touch pad 6 which extends along a front edge of the keyboard 4 is positioned in the proximity of a space key 4a which is used very frequently among the keys of the keyboard 4. The left and right click buttons 7 and 8 are disposed at a substantially central portion of the body 1 in the leftward and rightward directions forwardly and in the proximity of the touch pad 6. The left and right click buttons 7 and 8 are disposed in an aligned relationship with each other in the leftward and rightward directions of the body 1. The touch pad 6 is a kind of pointing device as known in the art.

The left click button 7 and the right click button 8 are disposed in a spaced relationship from each other by some distance in the leftward and rightward directions, and an operation element 10 of the rotation and push-in type is disposed in the space between the left and right click buttons 7 and 8. While the left click button 7, operation element 10 and right click button 8 are disposed in an aligned relationship with one another in the leftward and rightward directions of the body 1 in this manner, the operation element 10 is positioned in the proximity of the left and right click buttons 7 and 8 and in the proximity of the touch pad 6.

The operation element 10 includes a rotatable member 11 whose particular example is hereinafter described. The rotatable member 11 extends long in the leftward and rightward directions of the body 1 and partly projects upwardly a little from the palm rest 5. The rotatable member 11 is supported for forward and reverse rotation, that is, for forward and backward operation, around an axis extending substantially in parallel to the upper face of the body 1 in the leftward and rightward directions of the body 1. Further, the rotatable member 11 is mounted for downward push-in operation, that is, for depression operation. It is to be noted that members indicated by alternate long and two short dashes lines denoted by reference characters 10-1 and 10-2 in FIG. 2 relate to another embodiment of the present invention and are hereinafter described.

The operation element 10 basically has three-dimensional displacement factors including rotation in the forward direction, rotation in the reverse direction and push-in displacement of the rotatable member 11 thereof. Additionally, however, also an amount of rotation in each direction of rotation can be obtained, and besides, a speed of rotation can be obtained by arithmetic operation of the amount of rotation. In other words, a great number of different kinds of operation condition of the rotatable member 11 are available, and such different operations can be allocated to different functions to significantly improve the convenience of use of the notebook personal computer NP.

When the keyboard 4 is used to input various a information while the left and right hands are supported at portions near to the wrists thereof on the palm rest 5, the touch pad 6 and the left and right click buttons 7 and 8 are operated with a fingertip. Since the rotatable member 11 of the operation element 10 is positioned in the proximity of the touch pad 6 and in the proximity of the left and right click buttons 7 and 8, while inputting operation for the keyboard 4 is performed, an operation to rotate or push in the rotatable member 11 can be performed with a fingertip of, for example, the forefinger or the thumb without moving a hand by a great amount. Consequently, the rotatable member 11 can be operated with good operability. In addition, since the rotatable member 11 of the operation element 10 is positioned at a substantially central portion in the leftward and rightward directions of the body 1, irrespective of whether the hand more skillful to the other hand of the operator is the left hand or the right hand, the rotatable member 11 can be operated usually with the hand more skillful to the other hand. Consequently, the rotatable member 11 can be operated with better operability.

Figure 3:
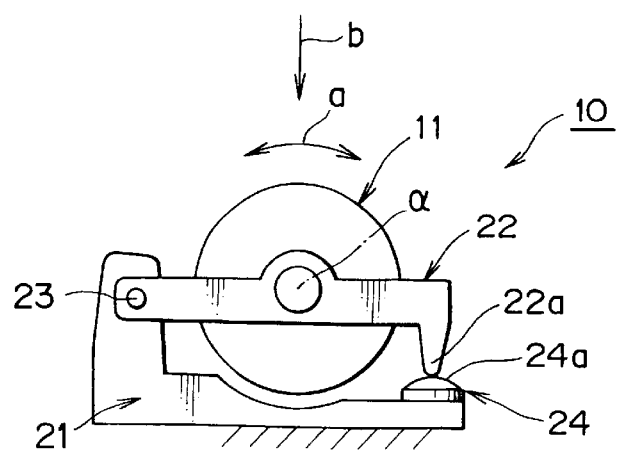
FIG. 3 is a schematic view illustrating a principle of an operation element of the rotation and push-in type.

Now, the operation element 10 is described in more detail with reference to FIGS. 3 to 13. Referring first to FIG. 3, there is shown a basic configuration of the operation element 10. The operation element 10 shown includes a base plate 21 secured to the body 1, and a support bracket 22 mounted for rocking motion around a fulcrum 23 on the base plate 21. The rotatable member 11 is supported for forward and reverse rotation as indicated by a double-sided arrow mark a in FIG. 3 on the support bracket 22, and the center of rotation thereof is indicated by reference character α. The rotatable member 11 forms an encoder of the rotary type, and a particular example thereof is hereinafter described in detail. Thus, when the rotatable member 11 is operated to rotate as indicated by the arrow mark a, the direction and the amount of rotation of the rotatable member 11 can be detected.

A contact 24 is mounted on the base plate 21 and is turned on when the rotatable member 11 is depressed. The support bracket 22 has a pressing portion 22a formed at a portion thereof immediately above the contact 24. A movable contact terminal 24a which forms an upper contact terminal of the contact 24 is formed from a leaf spring or the like and normally positioned such that the contact 24 is off. If the rotatable member 11 is operated so as to be pushed in as indicated by an arrow mark b in FIG. 3 against the resilient biasing force of the movable contact terminal 24a, then the movable contact terminal 24a is pushed and displaced downwardly by the pressing portion 22a of the support bracket 22 thereby to turn on the contact 24.

Figure 4:
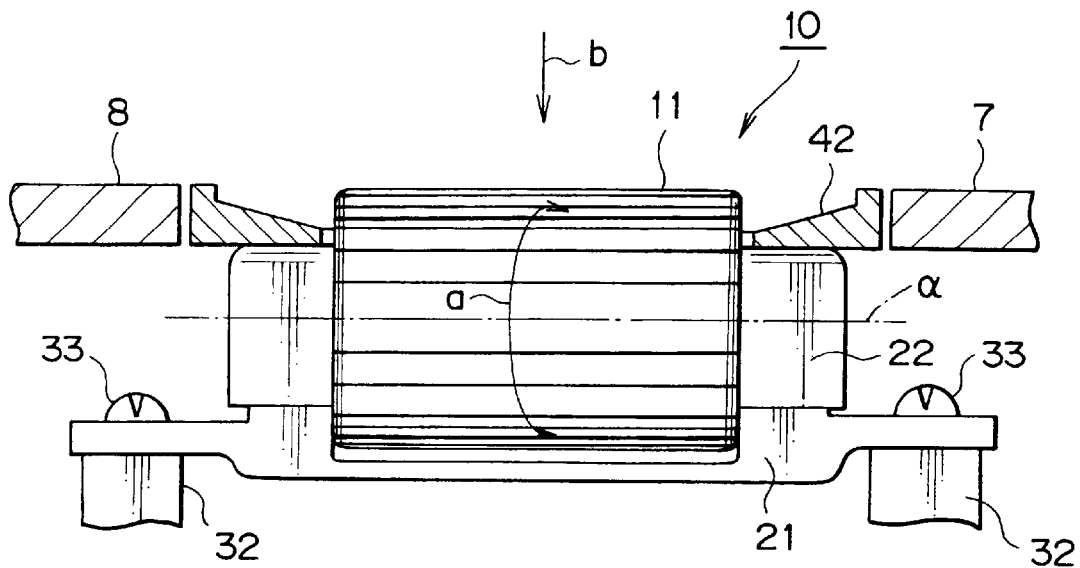
FIG. 4 is an enlarged sectional view taken along line IV—IV of FIG. 2 showing an operation element used in the personal computer of FIG. 1.

Now, a particular example of the operation element 10 is described with reference to FIGS. 4 to 13. The base plate 21 has a pair of mounting holes 31 as seen in FIG. 5 and secured to a pair of mounting boss portions 32 formed in the body 1 using screws 33 fitted in the mounting holes 31 as seen in FIG. 4.

Figure 7:
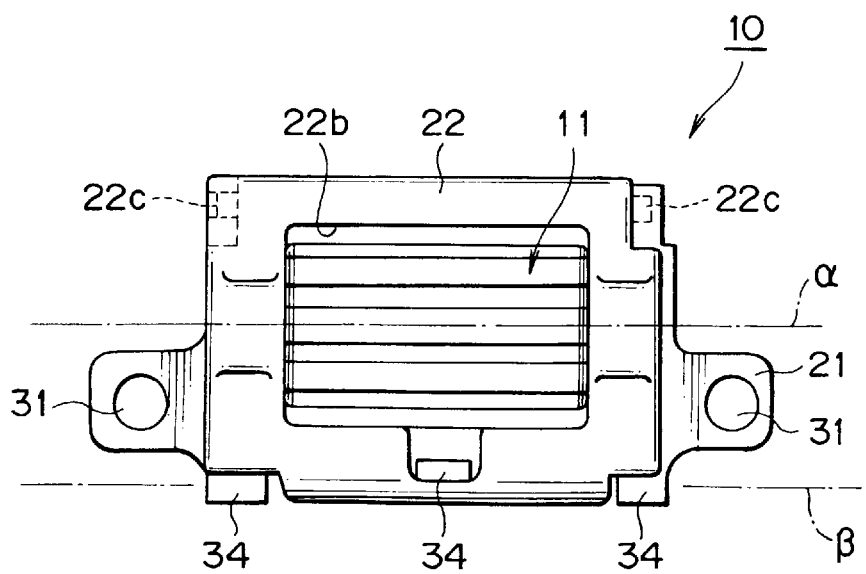
FIG. 7 is a top plan view of the operation element shown in FIG. 5.
Figure 8:
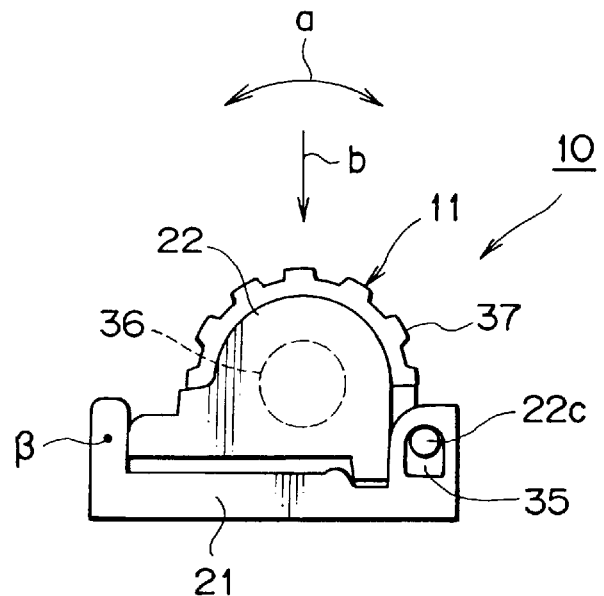
FIG. 8 is a right side elevational view of the operation element of FIG. 7.

The support bracket 22 has an opening 22b of a substantially rectangular shape corresponding to the shape of the rotatable member 11 as seen in FIG. 7. A side end edge of the support bracket 22 is held by a pair of holding tabs 34 provided in an aligned relationship with each other on the base plate 21, and an axial line β interconnecting the holding tabs 34 forms the fulcrum 23 illustrated in FIG. 3. The support bracket 22, however, is mounted for stroke displacement substantially linearly also in the upward and downward directions with respect to the holding tabs 34. The support bracket 22 has a pair of left and right studs 22c each in the form of a projection provided at side end edge portions thereof opposite to the side edge at which the holding tabs 34 are positioned. The studs 22c are fitted for displacement a little in the upward and downward directions in a pair of left and right holding holes 35 formed in the base plate 21 as seen in FIGS. 7 and 8. Consequently, the support bracket 22 is held for rocking movement around the axial line α and for displacement a little in the upward and downward directions on the base plate 21.

Figure 5:
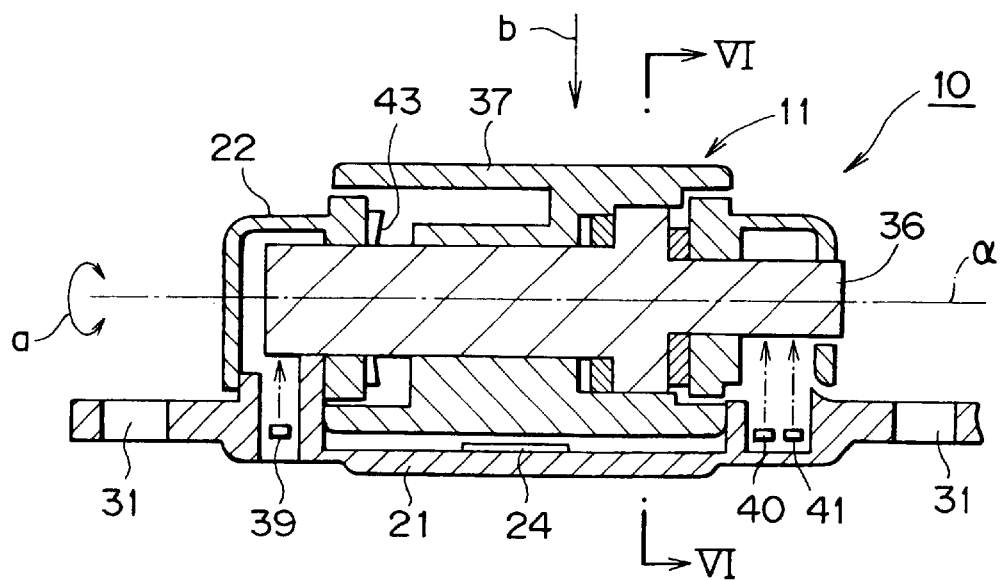
FIG. 5 is a sectional view taken along line V—V of FIG. 6 showing the operation element of FIG. 4 together with a contact section.

The contact 24 is formed on the base plate 21 as seen in FIGS. 5 and 6, and the pressing portion 22a is formed on a lower face of the support bracket 22 such that it is positioned immediately above the contact 24 having such resiliency as described above as seen in FIG. 6. When the rotatable member 11 is operated to be pushed in, the contact 24 is turned on. It is to be noted that, since the contact 24 and the pressing portion 22a are disposed such that they are present at a substantially central portion in the axial direction of the rotatable member 11, they should not originally appear in FIG. 6. However, in order to clearly indicate a relationship between the contact 24 and the pressing portion 22a, the contact 24 and the pressing portion 22a are shown in FIG. 6 such that they are displaced from their original positions to positions displaced in the axial direction of the rotatable member 11.

Figure 6:
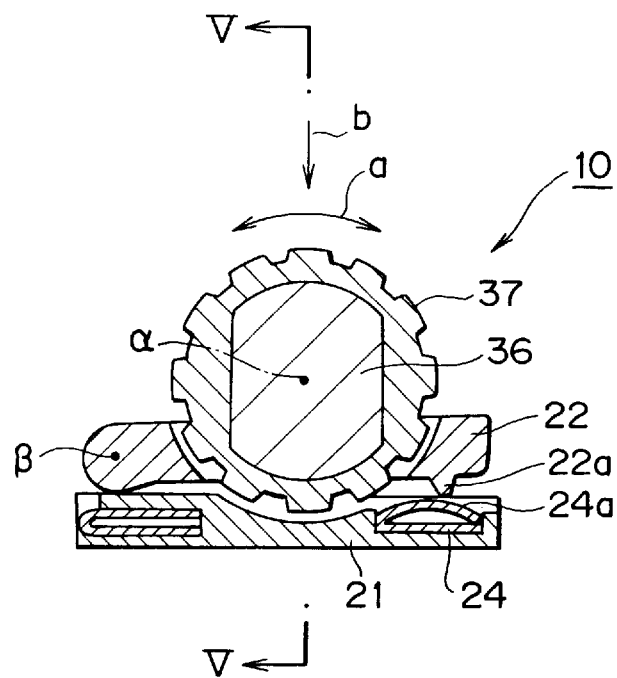
FIG. 6 is a sectional view taken along line VI—VI of FIG. 5.

The rotatable member 11 has a shaft member 36 and an outer cover member 37 fitted on and integrated with an outer periphery of the shaft member 36 as seen in FIGS. 5 and 6. The shaft member 36 provides the rotational axis α and is supported at the opposite left and right ends thereof for forward and reverse rotation on the support bracket 22. Since the outer cover member 37 is touched directly by the operator, it is formed from a soft synthetic resin material or the like so that it has a non-slip property, and in order to assure the non-slip property, projections are formed in an equidistantly spaced relationship in a circumferential direction on the outer periphery of the outer cover member 37. The outer cover member 37 partially projects a little upwardly from the support bracket 22 through the opening 22b of the support bracket 22. Further, though not particularly shown, the support bracket 22 is formed from a pair of left and right members in order to facilitate assembly of the rotatable member 11 and so forth.

Figure 9:
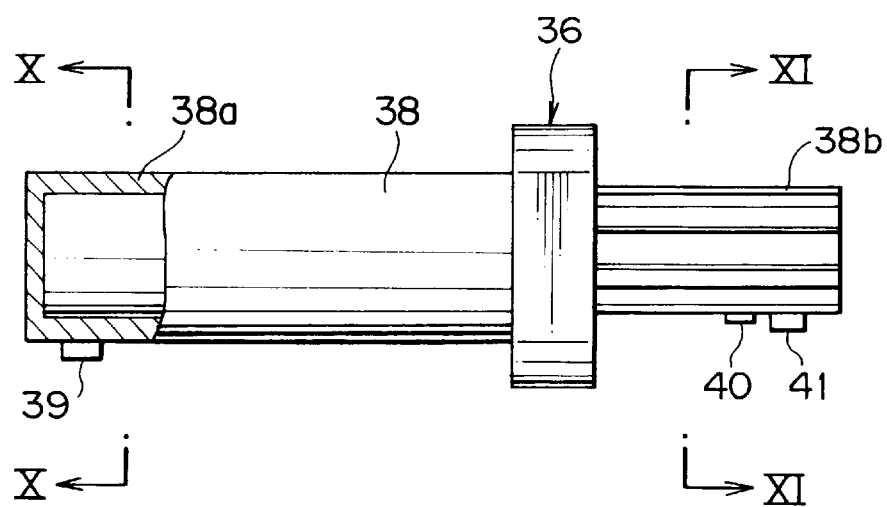
FIG. 9 is a side elevational view, partly in section, showing a shaft member which forms a rotatable member used in the personal computer of FIG. 1.
Figure 10:
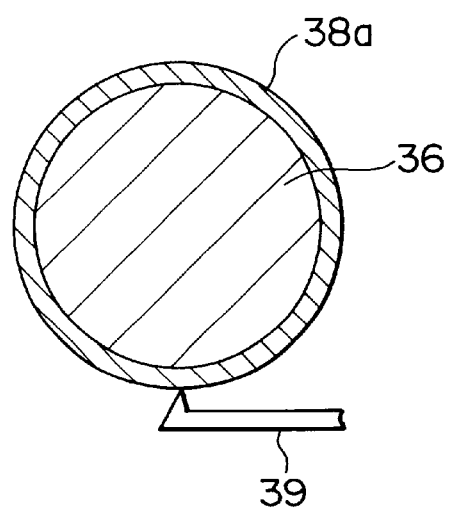
FIG. 10 is a sectional view taken along line X—X of FIG. 9.
Figure 11:
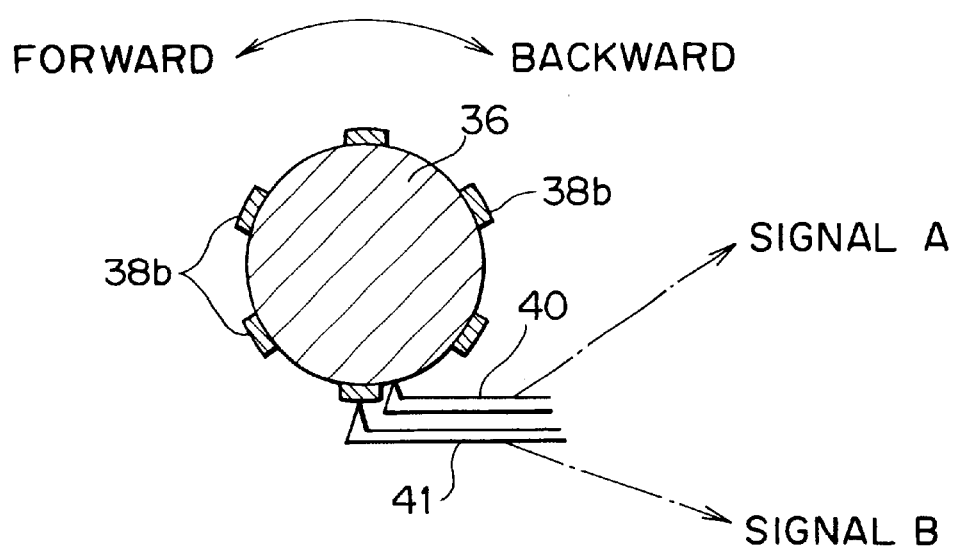
FIG. 11 is a sectional view taken along line XI—XI of FIG. 9.

The opposite end portions of the shaft member 36 are exposed without being covered with the outer cover member 37 as seen in FIG. 5. The shaft member 36 itself is formed from a synthetic resin or a like material so as to have electric insulation and has a conductive film 38 applied to an outer circumferential face thereof as seen in FIGS. 9 to 11. In FIGS. 10 and 11, the conductive film 38 is shown with a thickness greater than its actual thickness in order to clearly indicate the presence of the conductive film 38 itself.

The conductive film 38 is applied such that it extends over the entire circumference of the shaft member 36 at an end portion of the shaft member 36, and the first portion which extends over the entire circumference is denoted by reference character 38a. At the other end portion of the shaft member 36, the conductive film 38 is present intermittently at equal distances in the circumferential direction of the shaft member 36, and the second portion present at equal distances is denoted by reference character 38b.

An elongated input terminal 39 formed from a conductive spring member is provided on the base plate 21 and is normally held in contact with the first portion 38a as seen in FIG. 10. Further, a pair of elongated output terminals 40 and 41 each formed from a conductive spring member are provided on the base plate 21 and are normally biased toward the second portion 38b of the conductive film 38 as seen in FIG. 11. The output terminals 40 and 41 are disposed in a spaced relationship from each other in an axial direction of the shaft member 36 and in a little displaced relationship from each other in a circumferential direction of the shaft member 36.

Figure 12:
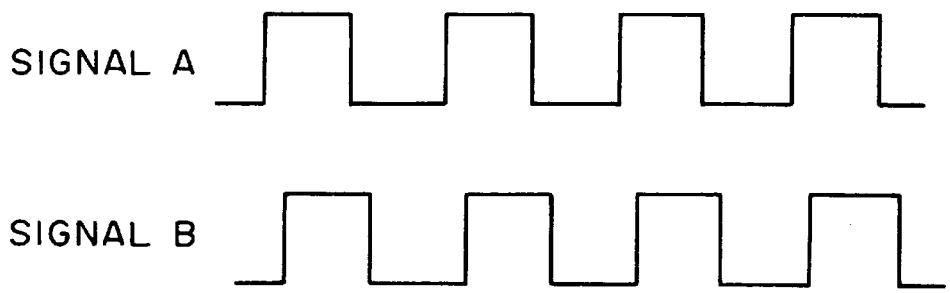
FIG. 12 is a time chart illustrating signal waveforms detected at output terminals when the operation element is rotated in the reverse direction.
Figure 13:
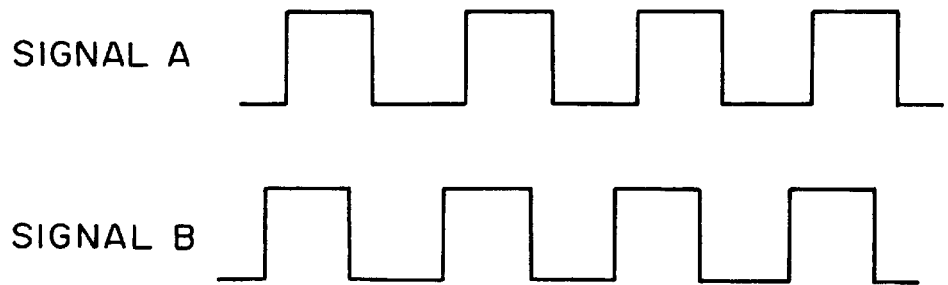
FIG. 13 is a similar view but illustrating signal waveforms detected at the output terminals when the operation element is rotated in the forward direction.

While a predetermined voltage is applied to the input terminal 39, such pulse-shaped voltage signals as illustrated in FIG. 12 or 13 are detected at the output terminals 40 and 41 in response to rotation of the rotatable member 11. The detection voltage from the output terminal 40 is denoted by signal A while the detection voltage from the output terminal 41 is denoted by signal B. The signal A and the signal B exhibit a time difference at such a detection time point as a point of time of a rising edge or a falling edge of a pulse. The direction of rotation of the rotatable member 11 is identified by comparing a detection time point of the signal A and a detection time point of the signal B with each other to discriminate which one of the detection time points is detected earlier in time. Further, the amount of rotation of the rotatable member 11 can be detected by counting the number of detected pulses. Furthermore, by arithmetically operating the amount of rotation per unit time, the speed of rotation of the rotatable member 11 can be detected.

It is to be noted that, in FIG. 4, reference numeral 42 denotes an ornamental plate, and in FIG. 5, reference numeral 43 denotes a leaf spring for applying suitable resistance to rotation of the rotatable member 11.

Figure 2:
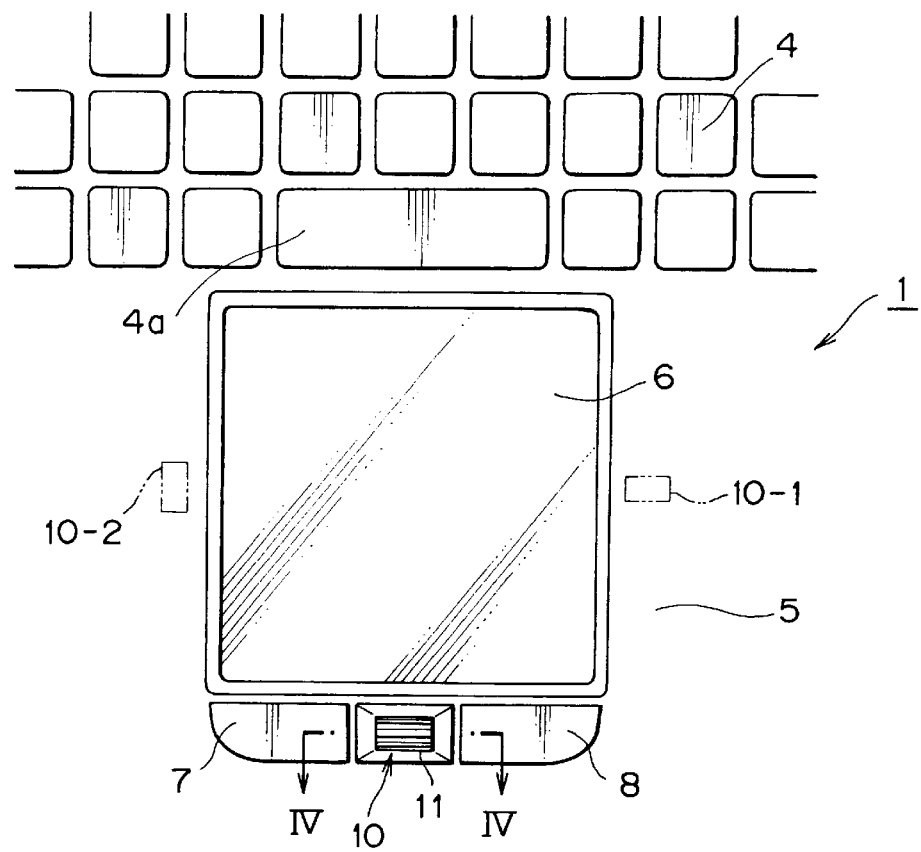
FIG. 2 is an enlarged top plan view of part of the personal computer of FIG. 1.

FIGS. 14 to 17 show personal computers according to different embodiments of the present invention similarly to the elements denoted by 10-1 and 10-2 and indicated by long and two short dashes lines in FIG. 2 and individually correspond to FIG. 2. In the following, the embodiments are described successively.

Figure 14:
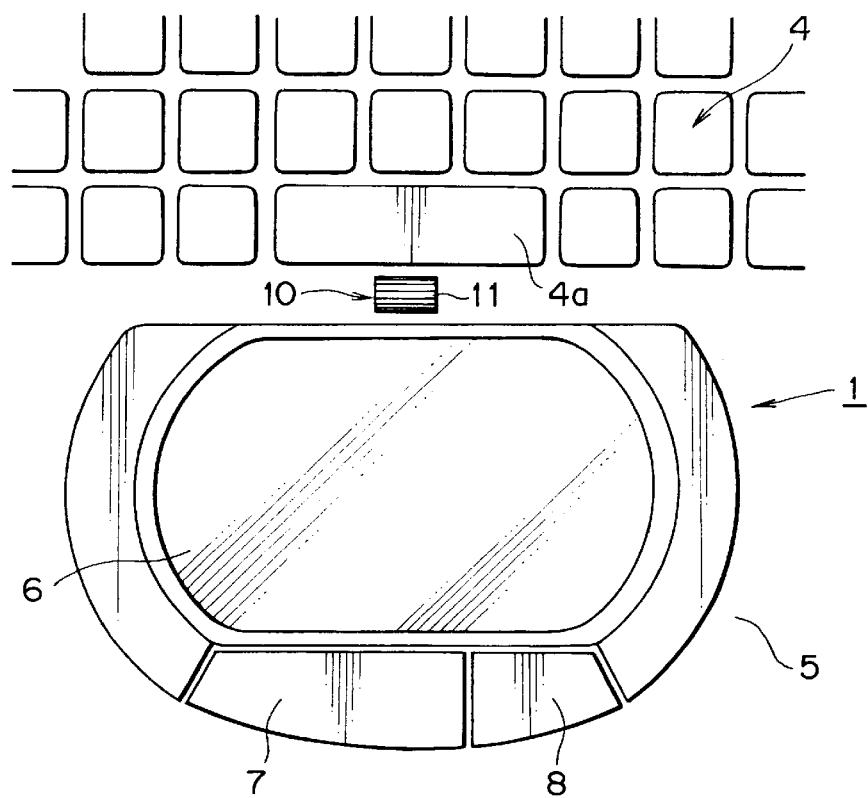
FIGS. 14 to 17 are partial plan views similar to FIG. 2 but showing different personal computers to which the present invention is applied.

Referring first to FIG. 14, the personal computer of the embodiment shown is different from that of FIG. 2 in that the shape of the touch pad 6 is modified such that it is rounded at the opposite left and right side edge portions thereof and the left click button 7 which is used in a comparatively high frequency is formed with a length in the leftward and rightward directions greater than that of the right click button 8 which is used in a comparatively low frequency. Further, the operation element 10 is disposed between the keyboard 4 and the touch pad 6, that is, disposed in a space defined by the keyboard 4 and the touch pad 6 from the front and the rear. In the present embodiment, the rotatable member 11 of the operation element 10 may be operated only with the forefinger.

Figure 15:
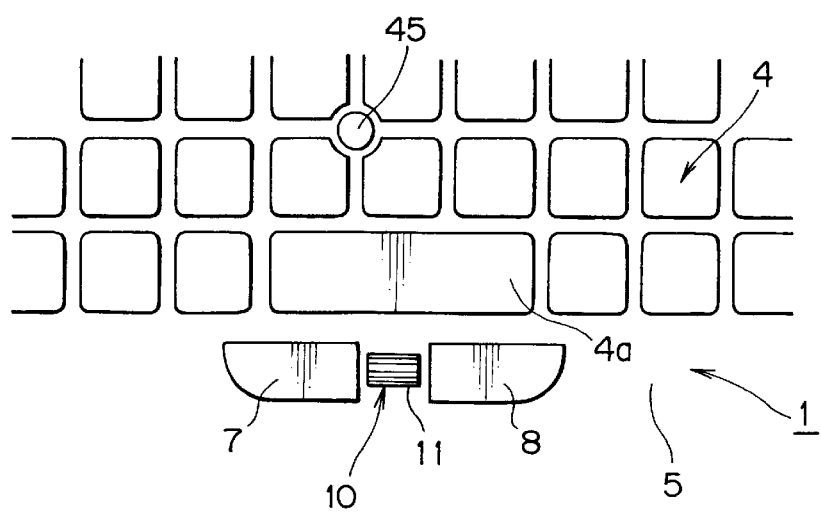

Referring now to FIG. 15, the embodiment shown uses a pointing device of the stick type in place of a touch pad. In particular, a stick 45 is disposed in the proximity of the space key 4a in the keyboard 4 such that it extends in the upward and downward directions and can be operated to be rocked with a fingertip. The left and right click buttons 7 and 8 and the operation element 10 are disposed such that the operation element 10 is disposed between the left click button 7 and the right click button 8 from the left and the right, respectively, similarly as in FIG. 2. Since the present embodiment does not include the touch pad 6, the left and right click buttons 7 and 8 and the operation element 10 are generally positioned in the proximity of the keyboard 4.

Figure 16:
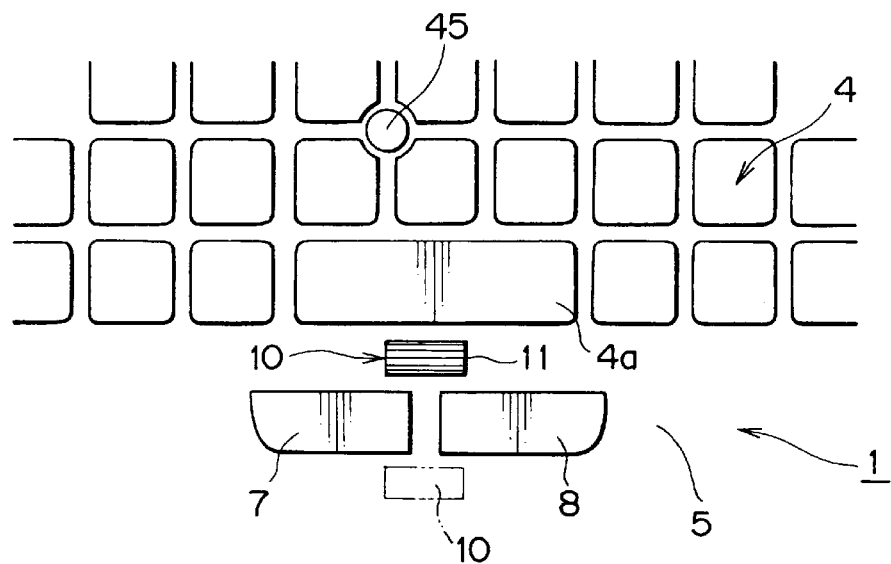

Referring to FIG. 16, the embodiment shown includes a pointing device of the stick type similarly to that of FIG. 15. However, the distance between the left click button 7 and the right click button 8 in the leftward and rightward directions is smaller than that in FIG. 15. The operation element 10 is disposed between the left and right click buttons 7 and 8 and the keyboard 4 as indicated by solid lines. However, the operation element 10 may be disposed forwardly of the left and right click buttons 7 and 8 as indicated by long and two short dashes lines in FIG. 16.

Figure 17:
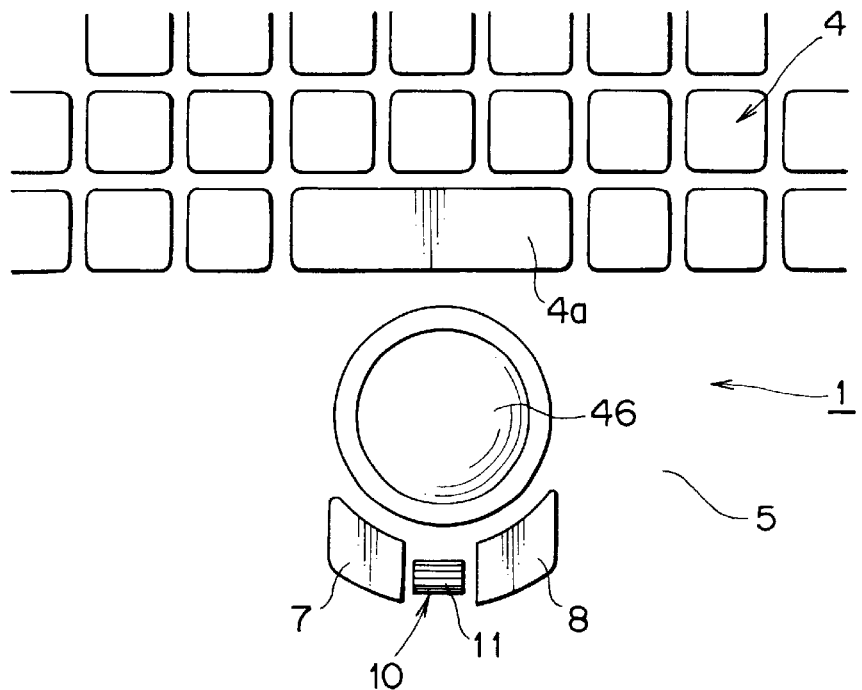

Referring to FIG. 17, the embodiment shown includes a pointing device of the track ball type. In particular, a track ball 46 is disposed for rotation forwardly of the keyboard 4 and is operated to be rotated with a fingertip. The left and right click buttons 7 and 8 and the operation element 10 are disposed forwardly of the track ball 46. It is to be noted that the operation element 10 may otherwise be disposed forwardly of the left and right click buttons 7 and 8 or else between the track ball 46 and the keyboard 4.

Referring back to FIG. 2, the operation element 10 may be replaced by a pair of operation elements 10-1 and 10-2 indicated by long and two short dashes lines. The operation element 10-1 is provided on the right side of the touch pad 6 while the other operation element 10-2 is provided on the left side of the touch pad 6. The operation element 10-1 is disposed such that it is operated to be rotated in the forward or rearward direction around an axial line extending in the leftward and rightward directions similarly to the operation element 10 indicated by solid lines in FIG. 2 while the operation element 10-2 is disposed such that it is operated to be rotated in the leftward or rightward direction around an axial line which extends in the forward and backward directions.

The two operation elements 10-1 and 10-2 may be used for different objects. For example, when spreadsheet software is used, scrolling can be performed in a form very near to the intuition of the operator such that scrolling in the upward and downward directions is performed making use of rotation of the operation element 10-1 in the forward and backward directions and scrolling in the leftward and rightward directions is performed making use of rotation of the operation element 10-2 in the leftward and rightward directions. It is to be noted that alternatively the operation element 10-1 which is operated to be rotated in the forward and backward directions is disposed on the left side of the touch pad 6 while the operation element 10-2 which is operated to be rotated in the leftward and rightward directions is disposed on the right side of the touch pad 6. Further, the operation elements 10-1 and 10-2 may otherwise be disposed, for example, between the touch pad 6 and the keyboard 4. Anyway, they can be located at arbitrarily selected positions only if they are in the proximity of the touch pad 6 or the left and right click buttons 7 and 8. Naturally, provision of such two kinds of operation elements 10-1 and 10-2 can be similarly applied also where the pointing device is of the stick type or the track ball type.

Figure 18:
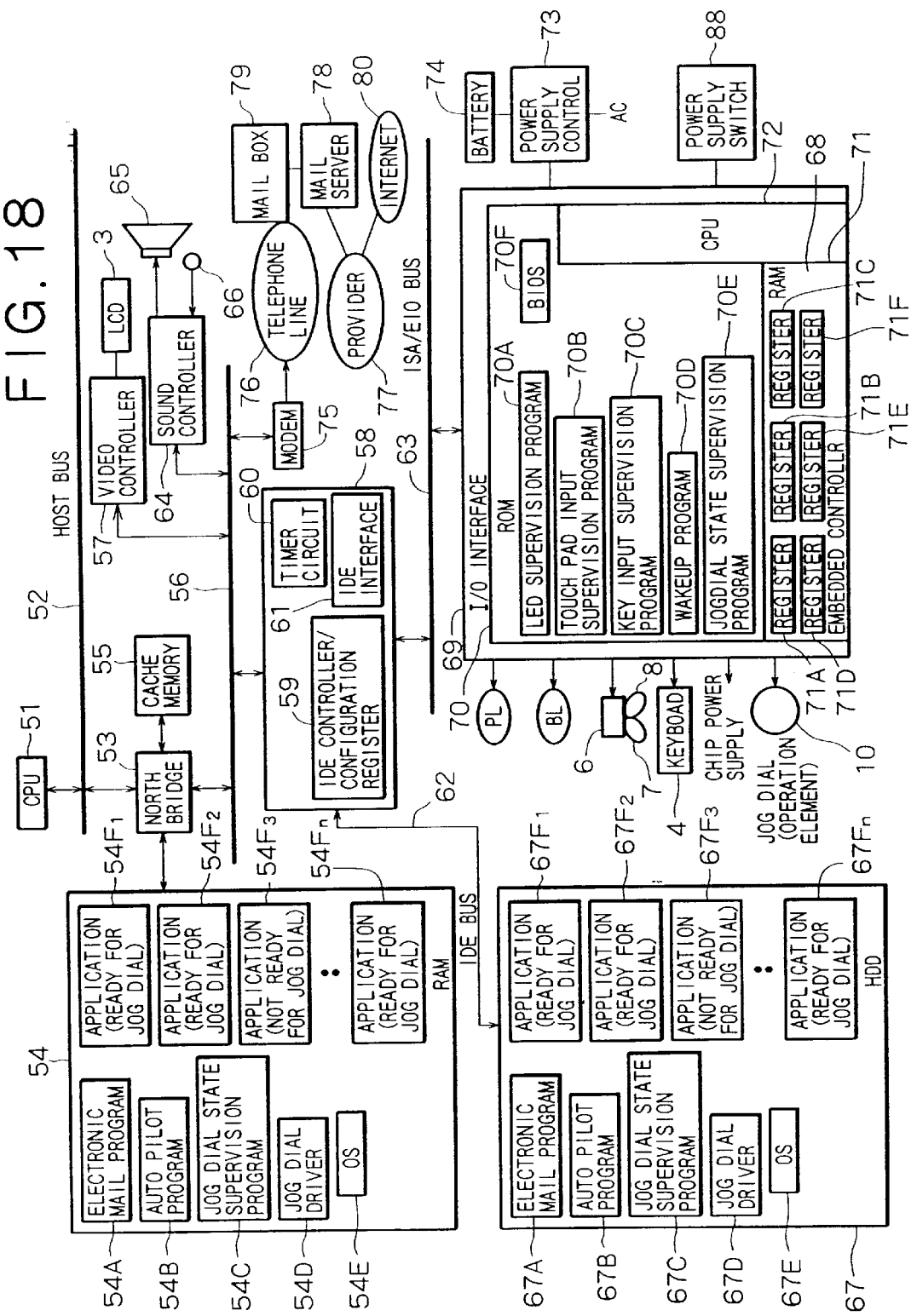
FIG. 18 is a block diagram showing an example of an electric circuit used in the personal computer of the notebook type of FIG. 1.

Now, an example of an electric configuration of the notebook personal computer NP is described with reference to FIG. 18. It is to be noted that the following description relates to an example wherein the operation element 10 is rotated in the forward and backward directions as in the embodiment of FIG. 2 in which it is indicated by solid lines.

A CPU (Central Processing Unit) 51 is formed from, for example, a Pentium (trademark) processor of Intel or the like and connected to a host bus 52. Also a north bridge 53 is connected to the host bus 52. The north bridge 53 is connected also to a PCI bus 56. The north bridge 53 is formed from, for example, the 400BX of Intel and controls the CPU 51, a main memory 54 and other associated elements. The north bridge 53 and a south bridge 58 cooperatively form a chip set.

The north bridge 53 is further connected to the main memory 54 and a cache memory 55. The cache memory 55 caches data to be used by the CPU 51. Though not shown, also the CPU 51 has a built-in primary cache memory.

The main memory 54 may be formed from, for example, a DRAM (Dynamic Random Access Memory) and stores programs to be executed by the CPU 51 and data necessary for operation of the CPU 51. More particularly, when startup of the notebook type personal computer 1 is completed, for example, an electronic mail program 54A, an auto pilot program 54B, a jog dial state supervision program 54C, a jog dial driver 54D, an operation program (OS) 54E, and other application programs 54F1 to 54Fn are stored in the main memory 54 as a result of transfer of them.

The electronic mail program 54A is used to transmit and receive a communication statement to and from a communication circuit such as a telephone circuit 76 through a modem 75 over a network. The electronic mail program 54A has a terminating mail acquisition function as a particular function. The terminating mail acquisition function executes a process of confirming whether or not a mail destined for the notebook personal computer NP (user) has terminated in a mail box 79 of a mail server 78 provided by a provider 77 and acquiring, if a terminating mail destined for the notebook type personal computer 1 is present, the mail.

The auto pilot program 54B successively starts up and processes a plurality of processes (or programs) set in advance in an order set in advance.

The OS (basic program software) 54E controls basic operation of the notebook personal computer NP and may be any of, for example, the Windows 95, Windows 98 of Microsoft, the Mac OS (trademark) of Apple Computer and so forth.

The jog dial state supervision program 54C receives a notification from any of the application programs of whether or not it is ready for a jog dial, and operates, if the application program is ready for a jog dial, to display operations which can be executed by an operation of a jog dial, that is, the operation element 10, to the user. The jog dial state supervision program 54C normally waits for an event of the operation element 10 and has a list for reception of a notification from the application program. The jog dial driver 54D executes various functions in response to an operation of the operation element 10.

A video controller 57 is connected to the PCI bus 56. The video controller 57 controls display of the display screen 3 based on data supplied thereto through the PCI bus 56.

A sound controller 64 is connected to the PCI bus 56 and fetches a sound input from a microphone 66 or supplies a sound signal to a speaker 65. Also the modem 75 is connected to the PCI bus 56. The modem 75 can be connected to a communication network 80 such as the Internet, the mail server 78 and so forth through the public telephone circuit 76 and the Internet service provider 77.

Also the south bridge 58 is connected to the PCI bus 56. The south bridge 58 may be formed from, for example, the PIIX4E of Intel and controls various inputs and outputs. In particular, the south bridge 58 includes an IDE (Integrated Drive Electronics) controller/configuration register 59, a timer circuit 60, an IDE interface 61 and so forth, and controls devices connected to the IDE bus 62 and devices connected through an ISA/EIO (Industry Standard Architecture/Extended Input Output) bus 63 and an embedded controller 68.

The IDE controller/configuration register 59 is formed from two IDE controllers including a primary IDE controller and a secondary IDE controller, a configuration register, and so forth.

The primary IDE controller is connected to a connector (not shown) by an IDE bus 62, and a hard disk drive (HDD) 67 is connected to the connector. The secondary IDE controller can be connected to a bay device not shown such as a CD-ROM drive or an IDE device such as a second HDD or an FDD (Floppy Disk Drive) by some other IDE bus through a connector of the bay device when the bay device is mounted.

The HDD 67 stores thereon an electronic mail program 67A, an auto pilot program 67B, a jog dial state supervision program 67C, a jog dial driver 67D, an OS (basic program software) 67E and a plurality of other application programs 67F1 to 67Fn. The programs 67A to 67Fn stored on the HDD 67 are successively transferred to and stored into the RAM 54 in the startup (boot-up) process.

Further, the embedded controller 68 is connected to the ISA/EIO bus 63. The embedded controller 68 is formed from a microcontroller and used as an I/O controller. In particular, the embedded controller 68 is formed from an I/O interface 69, a ROM 70, a RAM 71 and a CPU 72 connected to one another.

The ROM 70 has stored therein in advance, for example, an LED supervision program 70A, a touch pad input supervision program 70B, a key input supervision program 70C, a wakeup program 70D, and a jog dial state supervision program 70E.

The LED supervision program 70A is used to control lighting of a power supply lamp PL, a battery lamp BL, a message lamp ML when necessary and other lamps each in the form of an LED. The touch pad input supervision program 70B is used to supervise inputting by the user using the touch pad 6. The key input supervision program 70C is used to supervise inputting by the user using the keyboard 4 or other key switches. The wakeup program 70D manages various chip power supplies for checking based on current time data supplied thereto from the timer circuit 60 in the south bridge 58 whether or not a preset time comes and starting up a predetermined process (or program) when the preset time comes.

The jog dial state supervision program 70E is used to normally supervise whether or not the jog dial, that is, the rotatable member 10 of the operation element 11, is rotated or pushed in. Details of the jog dial state supervision program 70E are hereinafter described.

The ROM 70 further has a BIOS (Basic Input/Output System) 70F written therein. The BIOS is a basic input/output system and is a software program for controlling inputting and outputting of data between the OS or an application program and a peripheral equipment (the display unit, keyboard, HDD or the like).

The RAM 71 has registers for LED control, a touch pad input status, a key input status and set times, an I/O register for supervision of the jog dial state and so forth as registers 71A to 71F. For example, the LED control register 71A controls lighting of the message lamp ML for indicating an instantaneous startup state of an electronic mail, which is hereinafter described, when the operation element 10 is depressed. The key input status register 71C stores an operation key flag when the operation element 10 is depressed. The set time register 71D can arbitrarily set a certain time therein.

The embedded controller 68 is connected to the operation element 10, touch pad 6, click buttons 7 and 8, and keyboard 4 through the connector not shown so that, if the user performs an operation using the operation element 10, touch pad 6, click button 7 or 8 or keyboard 4, then it outputs a signal corresponding to the operation from the operation element 10, touch pad 6, click button 7 or 8, or keyboard 4 to the ISA/EIO bus 63. Further, the power supply lamp PL, the battery lamp BL, the message lamp ML and the other lamps each in the form of an LED are connected to the embedded controller 68.

Furthermore, a power supply control circuit 73 is connected to the embedded controller 68. The power supply control circuit 73 is connected to a built-in battery 74 or an AC power supply, and supplies necessary power to the individual blocks and controls charging of the built-in battery 74 and secondary batteries of peripheral equipments. Further, the embedded controller 68 supervises a power supply switch 88 which is operated to switch on or off power supply.

The embedded controller 68 can normally execute the programs 70A, 70B, 70C, 70D and 70E with its internal power supply even when the power supply thereto is off. In particular, the programs 70A to 70E are normally operating even when no window is open on the LCD of the display screen 3. Accordingly, even if the power supply switch 88 is off and the OS 54E is not operating on the CPU 51, the embedded controller 68 normally executes the jog dial state supervision program 70E and provides a programmable power key (PPK) function even if a key for exclusive use is not provided for the notebook personal computer NP though not particularly described herein. Thus, even if the notebook personal computer NP is, for example, in a power saving mode or in a power supply off state, the user can start up favorable software or a favorable script file only by depressing the operation element 10.

Figure 19:
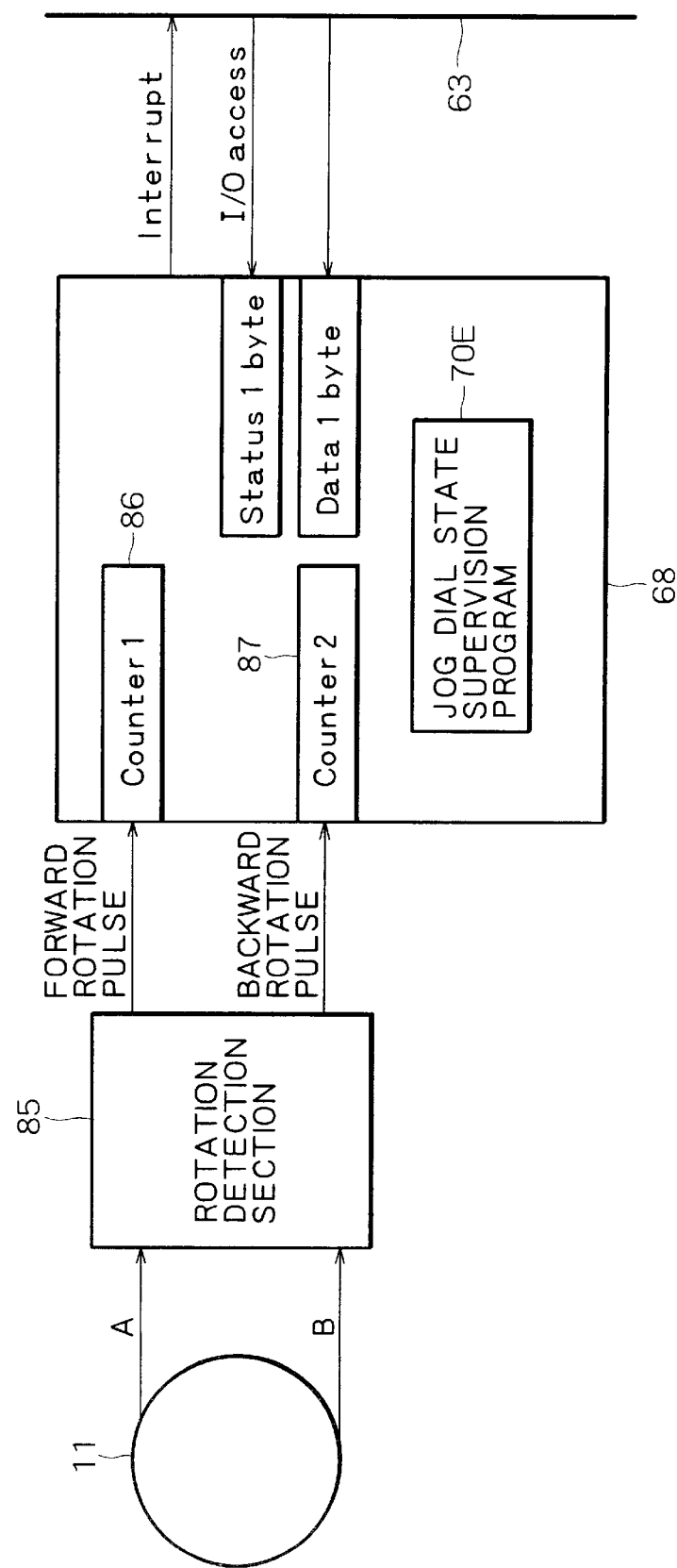
FIG. 19 is a block diagram showing an example of an electric configuration for detecting the direction and the amount of rotation of the operation element of FIG. 2.
Figure 20:
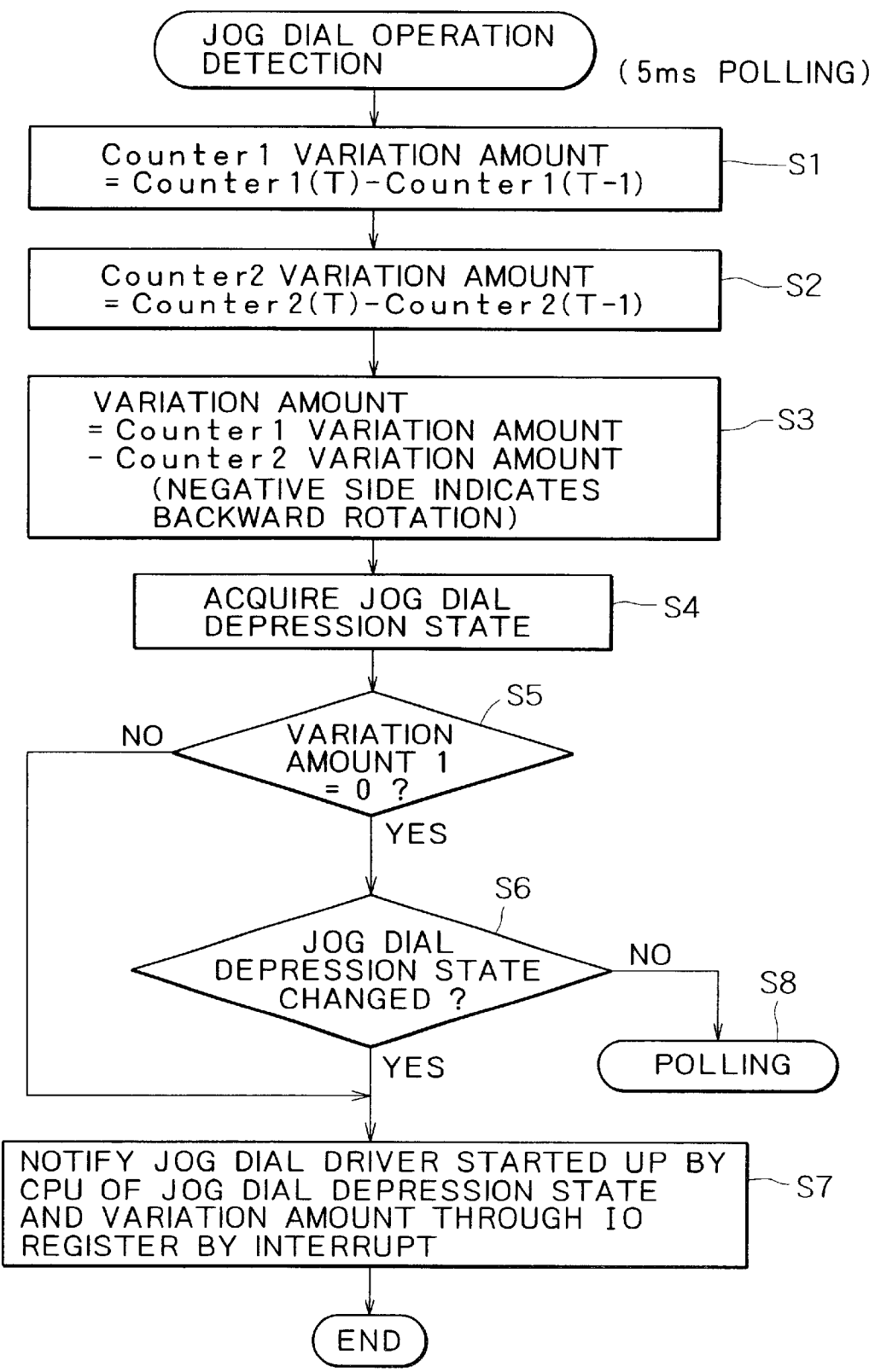
FIG. 20 is a flow chart illustrating a process for detection of an operation state of the operation element of FIG. 2.

Now, operation of the embedded controller 68 when the jog dial state supervision program 70E is executed is described with reference to FIGS. 12, 13, 19 and 20. FIG. 19 shows a hardware configuration wherein rotation of the rotatable member 11 of the operation element 10 is supervised by the embedded controller 68 through a rotation detection section 85. FIG. 20 illustrates a procedure when the embedded controller 68 executes the jog dial state supervision program 70E.

First, if the rotatable member 11 of the operation element 10 is rotated forwardly or backwardly, then the rotation detection section 85 detects whether the rotation is forward rotation or backward rotation based on timings of the signal A and the signal B illustrated in FIGS. 12 and 13. If the rotation detection section 85 detects that the rotation is forward rotation, then it supplies a forward rotation pulse signal to a counter (1) 86 of the embedded controller 68. On the other hand, if the rotation detection section 85 detects that the rotation is backward rotation, then it supplies a backward rotation pulse signal to another counter (2) 87 of the embedded controller 68. The embedded controller 68 executes the jog dial state supervision program 70E and performs polling of 5 ms to supervise the amounts of variation of the counter (1) 86 and the counter (2) 87, the difference between the amounts of variation and whether or not the operation element 10 is pushed in.

First, in step S1 of FIG. 20, the embedded controller 68 subtracts a count value Counter1(T−1) at time T−1 from a count value Counter1(T) at present time T of forward rotation pulses to determine a variation amount Counter1 of the count value of the counter 86. Then in step S2, the embedded controller 68 subtracts a count value Counter2 (T−1) at time T−1 from a count value Counter2(T) at present time T of backward rotation pulses to determine a variation amount Counter2 of the count value of the counter 87. Then in step S3, the embedded controller 68 determines the difference between the variation amounts of the count values, that is, the difference between the variation amount Counter1 and the variation amount Counter2. If the difference between the variation amounts exhibits a negative value, then the rotation in this instance is backward rotation.

In step S4, the embedded controller 68 acquires a depression condition of the operation element 10. In step S5, the embedded controller 68 discriminates the variation amount determined in step S3 described above. Further in step S6, the embedded controller 68 discriminates whether or not the depression condition of the operation element 10 exhibits a variation. If a variation amount is detected in step S5 or a depression condition is detected in step S6, then the processing advances to step S7, in which the embedded controller 68 notifies the jog dial driver 54D started up by the CPU 51 of the depression condition and the variation amount of the operation element 10 at present through the I/O register 71F by interrupt.

If the depression condition of the operation element 10 does not exhibit a variation in step S6, then the processing advances to step S8, in which the polling is ended. Thereafter, the processing beginning with step S1 is repeated after lapse of time of 5 ms.

Figure 21:
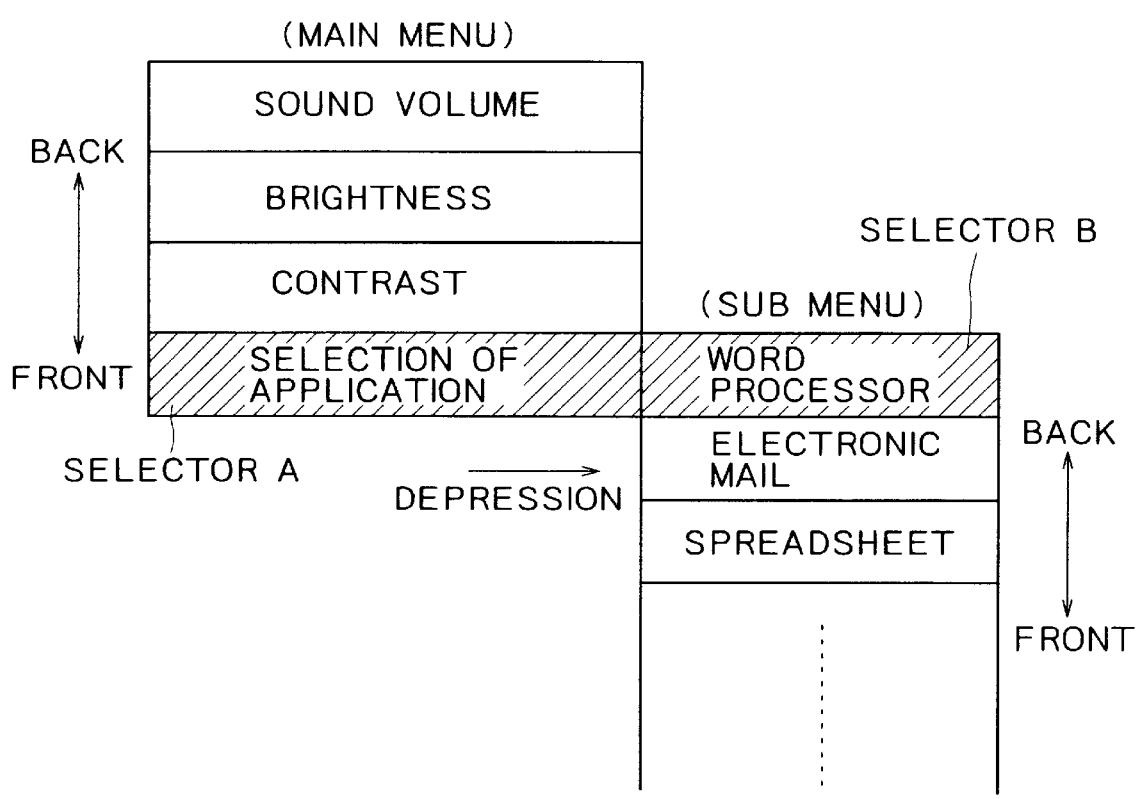
FIG. 21 is a diagrammatic view illustrating an example of use of the operation element of FIG. 2.

Now, an example of use of the operation element 10 is described. When the CPU 51 executes the jog dial state supervision program 54C after the power supply switch 88 is switched on, if the operation element 10 is operated to be pushed in while no active application is present, then such a main menu as illustrated in FIG. 21 is displayed on the display screen 3. The main menu includes four items of the sound volume, brightness, contrast and selection of application, and when the main menu is displayed, it is initially displayed in such a state that the sound volume is selected. It is to be noted that an item currently selected is indicated by slanting lines, and it can be seen that, in FIG. 21, the item of the selection of application is selected.

Then, if the operation element 10 is rotated backwardly, then the selected item is successively changed over from the sound volume to the brightness, contrast and selection of application. However, if the operation element 10 is rotated forwardly, then the selected item is successively changed over in the order reverse to that described above. As the speed of rotation of the operation element 10 rises, the speed of changeover of the selected item increases. In other words, the speed of rotation of the operation element 10 corresponds to the speed of scrolling. Then, if the operation element 10 is operated to be pushed in while the selection of application is selected as seen in FIG. 21, then a sub menu of the selection of application is displayed. The sub menu includes such items as the word processor, electronic mail, and spreadsheet as exemplary items in FIG. 21, and any application displayed in the sub menu can be executed in response to an operation of the operation element 10.

By operating the operation element 10 to rotate in the forward or backward direction, selection of an application displayed in the sub menus is performed similarly as in selection on the main menu. Then, if the operation element 10 is operated to be pushed in while a desired application is selected, then execution of the selected application is started.

The method of use of the operation element 10 described above with reference to FIG. 21 is a mere example of use at all, and it can be set arbitrarily in what manner a function corresponding to an operation of the operation element 10 is provided. For example, if the operation element 10 is rotated forwardly while word processor software is executed, then writing displayed on the display screen 3 is scrolled in the forward direction, that is, to a preceding portion of the writing, but if the operation element 10 is rotated backwardly, then the writing is scrolled in the backward direction.

As another example, when map software is started up and a map is displayed on the display screen 3, if the operation element 10 is rotated forwardly, then a portion of the map around a point designated by a pointer is displayed in an enlarged scale, but if the operation element 10 is rotated backwardly, then the map is displayed in a reduced scale.

Also it is possible to scroll, when spreadsheet software is started up and a spreadsheet is displayed on the display screen 3, the spreadsheet in response to forward or backward rotation of the operation element 10 and change the scrolling direction in response to a push-in operation of the operation element 10. In particular, immediately after the spreadsheet software is started up, the spreadsheet is scrolled in the forward or backward direction, that is, in the upward or downward direction on the display screen 3 by forward or backward rotation of the operation element 10. After the operation element 10 is operated to be pushed in in the condition wherein the spreadsheet is scrolled in the forward or backward direction, the spreadsheet is scrolled in the leftward or rightward direction by forward or backward rotation of the operation element 10. After the operation element 10 is operated to be pushed in in the condition wherein the spreadsheet is scrolled in the leftward or rightward direction, the spreadsheet is scrolled in the forward or backward direction by forward or backward rotation of the operation element 10.

While preferred embodiments of the present invention have been described using specific terms, such description is for illustrative purposes only, and it is to be understood that changes and variations may be made without departing from the spirit or scope of the following claims. For example, the portable information processing apparatus is not limited to a notebook personal computer but may be any apparatus wherein a lid member having a display screen is mounted for folding and unfolding movement on and with respect to a body having a keyboard on an upper face thereof and a touch pad or a click button is provided on the upper face of the body.

What is claimed is:

1. A portable information processing apparatus, comprising:
    a body having a keyboard on an upper face thereof;
    a lid member having a display screen thereon and mounted for folding and unfolding movement on and with respect to said body;
    a touch pad provided at a substantially central position of the upper face of said body in the leftward and rightward directions of said body forwardly of said keyboard; and
    an operation element mounted in the proximity of said touch pad on the upper face of said body for forward and reverse rotation around an axial line extending substantially in parallel to the upper face of said body and for bodily displacement by push-in operation thereof.

2. A portable information processing apparatus according to claim 1, further comprising a left click button and a right click button disposed on the upper face of said body in the proximity and forwardly of said touch pad, said operation element being disposed at a substantially middle position between said left click button and said right click button in the leftward and rightward directions of said body.

3. A portable information processing apparatus according to claim 2, wherein said left click button and said right click button are disposed in a spaced relationship from each other in the leftward and rightward directions, and said operation element is disposed at a position between said left click button and said right click button in the leftward and rightward directions of said body such that said left click button, said operation element and said right click button are aligned with one another in the leftward and rightward directions.

4. A portable information processing apparatus according to claim 1, wherein said operation element is disposed at a position between said keyboard and said touch pad in the forward and backward directions.

5. A portable information processing apparatus according to claim 4, further comprising a left click button and a right click button provided on the upper face of said body in the proximity and forwardly of said touch pad.

6. A portable information processing apparatus according to claim 1, wherein the axial line of said operation element extends in the leftward and rightward directions such that said operation element is forwardly and reversely rotatable in the forward and backward directions.

7. A portable information processing apparatus according to claim 1, wherein said operation element is disposed on the right side or the left side of said touch pad.

8. A portable information processing apparatus according to claim 1, wherein said operation element is provided on both of the left and right sides of said touch pad, and one of the operation elements is disposed such that the axial line thereof extends in the leftward and rightward directions and the operation element is forwardly and reversely rotatable in the forward and backward directions while the other operation element is disposed such that the axial line thereof extends in the forward and backward directions and the operation element is forwardly and reversely rotatable in the leftward and rightward directions.

9. A portable information processing apparatus, comprising:

a body having a keyboard on an upper face thereof;

a lid member having a display screen thereon and mounted for folding and unfolding movement on and with respect to said body;

a left click button and a right click button provided at a substantially central position of the upper face of said body in the leftward and rightward directions of said body forwardly of said keyboard; and an operation element mounted in the proximity of said click buttons on the upper face of said body for forward and reverse rotation around an axial line extending substantially in parallel to the upper face of said body and for bodily displacement by push-in operation thereof.

10. A portable information processing apparatus according to claim 9, wherein said operation element is disposed at a substantially middle position between said left click button and said right click button in the leftward and rightward directions of said body.

11. A portable information processing apparatus according to claim 10, wherein said left click button and said right click button are disposed in a spaced relationship from each other in the leftward and rightward directions, and said operation element is disposed at a position between said left click button and said right click button in the leftward and rightward directions of said body such that said left click button, said operation element and said right click button are aligned with one another in the leftward and rightward directions.

12. A portable information processing apparatus according to claim 10, wherein said operation is disposed at a position displaced in the forward or backward direction from said left click button and said right click button.

13. A portable information processing apparatus according to claim 10, further comprising a pointer operation element of the stick type provided at a substantially central position of said keyboard in the leftward and rightward directions of said body.

14. A portable information processing apparatus according to claim 10, further comprising a pointer operation element of the track ball type provided at a substantially central position of the upper face of said body in the leftward and rightward directions of said body forwardly of said keyboard.

* * * * *